United States Patent
Yamada (10) Patent No.: US 8,599,198 B2
(45) Date of Patent: Dec. 3, 2013

(54) PSEUDO 3D IMAGE CREATION APPARATUS AND DISPLAY SYSTEM

(75) Inventor: Kunio Yamada, Kanagawa-ken (JP)

(73) Assignee: Victor Company of Japan, Ltd., Yokohama (JP)

(*) Notice: Subject to any disclaimer, the term of this patent is extended or adjusted under 35 U.S.C. 154(b) by 465 days.

(21) Appl. No.: 12/923,323

(22) Filed: Sep. 15, 2010

(65) Prior Publication Data
US 2011/0080400 A1 Apr. 7, 2011

(30) Foreign Application Priority Data
Oct. 2, 2009 (JP) .................................. 2009-230056

(51) Int. Cl.
*G06T 15/00* (2011.01)

(52) U.S. Cl.
USPC ........................................................ 345/419

(58) Field of Classification Search
USPC ........................................................ 345/419
See application file for complete search history.

(56) References Cited

U.S. PATENT DOCUMENTS

| 7,262,767 B2 | 8/2007 | Yamada | |
| 2009/0022396 A1* | 1/2009 | Watanabe et al. | 382/167 |
| 2009/0041339 A1* | 2/2009 | Yamada et al. | 382/154 |
| 2011/0090216 A1* | 4/2011 | Yamada et al. | 345/419 |

FOREIGN PATENT DOCUMENTS

| JP | 10-051812 | 2/1998 |
| JP | 4214976 | 11/2008 |
| JP | 2009-044722 | 2/2009 |

* cited by examiner

*Primary Examiner* — Ryan R Yang
*Assistant Examiner* — Jin Ge
(74) *Attorney, Agent, or Firm* — Louis Woo (57) ABSTRACT

A plurality of basic depth models indicate depth values of a plurality of basic scene structures. Statistical amounts of pixel values in predetermined areas in a non-3D image are calculated to generate first evaluation values. A statistical amount of pixel values in a whole of the non-3D image is calculated to generate a second evaluation value. The basic depth models are combined into a combination result according to a combination ratio depending on the generated first evaluation values. Depth estimation data is generated from the combination result and the non-3D image. A texture of the non-3D image is shifted in response to the generated depth estimation data and the generated second evaluation value to generate a different-viewpoint picture signal. The generated different-viewpoint picture signal and a picture signal representative of the non-3D image make a stereo pair representing a pseudo 3D image.

4 Claims, 4 Drawing Sheets

PSEUDO 3D IMAGE CREATION APPARATUS AND DISPLAY SYSTEM

BACKGROUND OF THE INVENTION

1. Field of the Invention

This invention relates to a pseudo 3D (three-dimensional) image creation apparatus and a pseudo 3D image display system.

2. Description of the Related Art

There are many ways to allow a non-3D image to be viewed as a 3D image in a 3D display system. In each of these ways, a pseudo 3D image is created from a regular still 2D image or moving 2D image, that is, a 2D image (a non-3D image) having depth information supplied neither explicitly nor, unlike a stereo image, implicitly.

U.S. Pat. No. 7,262,767 (corresponding to Japanese patent number 4214976) discloses a pseudo 3D image creation device designed to create a pseudo 3D image from a non-3D image.

The device of U.S. Pat. No. 7,262,767 calculates a high-frequency component value of a top part of the non-3D image, and a high-frequency component value of a bottom part thereof. The device includes frame memories storing three types of basic depth models indicating the depth values of three basic types of scene structures. A composition ratio is determined according to the calculated high-frequency component values. The three types of basic depth models are combined into fundamental depth data at the determined composition ratio. The R signal of the non-3D image is superimposed on the fundamental depth data to produce final depth data. The final depth data can be used in creating a pseudo 3D image from the non-3D image.

Regarding a non-3D image having a complicated pattern and a lot of edges, a pseudo 3D image created by the device of U.S. Pat. No. 7,262,767 tends to give a viewer a strong feeling of 3D. On the other hand, regarding a non-3D image having a simple pattern and few edges only, a pseudo 3D image created by the device of U.S. Pat. No. 7,262,767 tends to give a viewer a weak feeling of 3D.

SUMMARY OF THE INVENTION

It is a first object of this invention to provide a pseudo 3D image creation apparatus capable of creating, from a non-3D image, a pseudo 3D image which can give a viewer a sufficient feeling of 3D regardless of whether the non-3D image has a complicated pattern and a lot of edges or a simple pattern and few edges only.

It is a second object of this invention to provide a pseudo 3D image display system capable of creating a pseudo 3D image from a non-3D image and indicating the created pseudo 3D image which can give a viewer a sufficient feeling of 3D regardless of whether the non-3D image has a complicated pattern and a lot of edges or a simple pattern and few edges only.

A first aspect of this invention provides a pseudo 3D image creation apparatus comprising means for storing a plurality of basic depth models indicating depth values of a plurality of basic scene structures; means for calculating statistical amounts of pixel values in predetermined areas in a non-3D image to generate first evaluation values, wherein the non-3D image has depth information supplied neither explicitly nor, unlike a stereo image, implicitly; means for calculating a statistical amount of pixel values in a whole of the non-3D image to generate a second evaluation value; means for combining said stored plurality of basic depth models into a combination result according to a combination ratio depending on the generated first evaluation values; means for generating depth estimation data from said combination result and the non-3D image; means for shifting a texture of the non-3D image in response to the generated depth estimation data and the generated second evaluation value to generate a different-viewpoint picture signal; and means for outputting the generated different-viewpoint picture signal and a picture signal representative of the non-3D image as a pseudo 3D picture signal.

A second aspect of this invention provides a pseudo 3D image display system comprising means for storing a plurality of basic depth models indicating depth values of a plurality of basic scene structures; means for calculating statistical amounts of pixel values in predetermined areas in a non-3D image to generate first evaluation values, wherein the non-3D image has depth information supplied neither explicitly nor, unlike a stereo image, implicitly; means for calculating a statistical amount of pixel values in a whole of the non-3D image to generate a second evaluation value; means for combining said stored plurality of basic depth models into a combination result according to a combination ratio depending on the generated first evaluation values; means for generating depth estimation data from said combination result and the non-3D image; means for shifting a texture of the non-3D image in response to the generated depth estimation data and the generated second evaluation value to generate a different-viewpoint picture signal; and means for using one of the generated different-viewpoint picture signal and a picture signal representative of the non-3D image as a right-eye picture signal and using the other as a left-eye picture signal, and indicating a pseudo 3D image in response to the right-eye picture signal and the left-eye picture signal.

A third aspect of this invention provides a pseudo 3D image creation apparatus comprising a memory configured to store a plurality of basic depth models indicating depth values of a plurality of basic scene structures; a calculator configured to calculate statistical amounts of pixel values in predetermined areas in a non-3D image to generate first evaluation values, wherein the non-3D image has depth information supplied neither explicitly nor, unlike a stereo image, implicitly; a calculator configured to calculate a statistical amount of pixel values in a whole of the non-3D image to generate a second evaluation value; a combining device configured to combine said stored plurality of basic depth models into a combination result according to a combination ratio depending on the generated first evaluation values; a generator configured to generate depth estimation data from said combination result and the non-3D image; a shifter configured to shift a texture of the non-3D image in response to the generated depth estimation data and the generated second evaluation value to generate a different-viewpoint picture signal; and an outputting device configured to output the generated different-viewpoint picture signal and a picture signal representative of the non-3D image as a pseudo 3D picture signal.

A fourth aspect of this invention provides a pseudo 3D image creation apparatus comprising means for calculating an evaluation value of high-spatial-frequency components of a first picture signal for a whole of a non-3D image represented by the first picture signal; and means for shifting a texture of the non-3D image relative to frame in response to the calculated evaluation value to convert the first picture signal into a second picture signal different in viewpoint from the first picture signal.

A fifth aspect of this invention is based on the fourth aspect thereof, and provides a pseudo 3D image creation apparatus further comprising means for using the first picture signal and the second picture signal as a stereo pair and visualizing the stereo pair to present a pseudo 3D image.

DETAILED DESCRIPTION OF THE INVENTION

Figure 1:
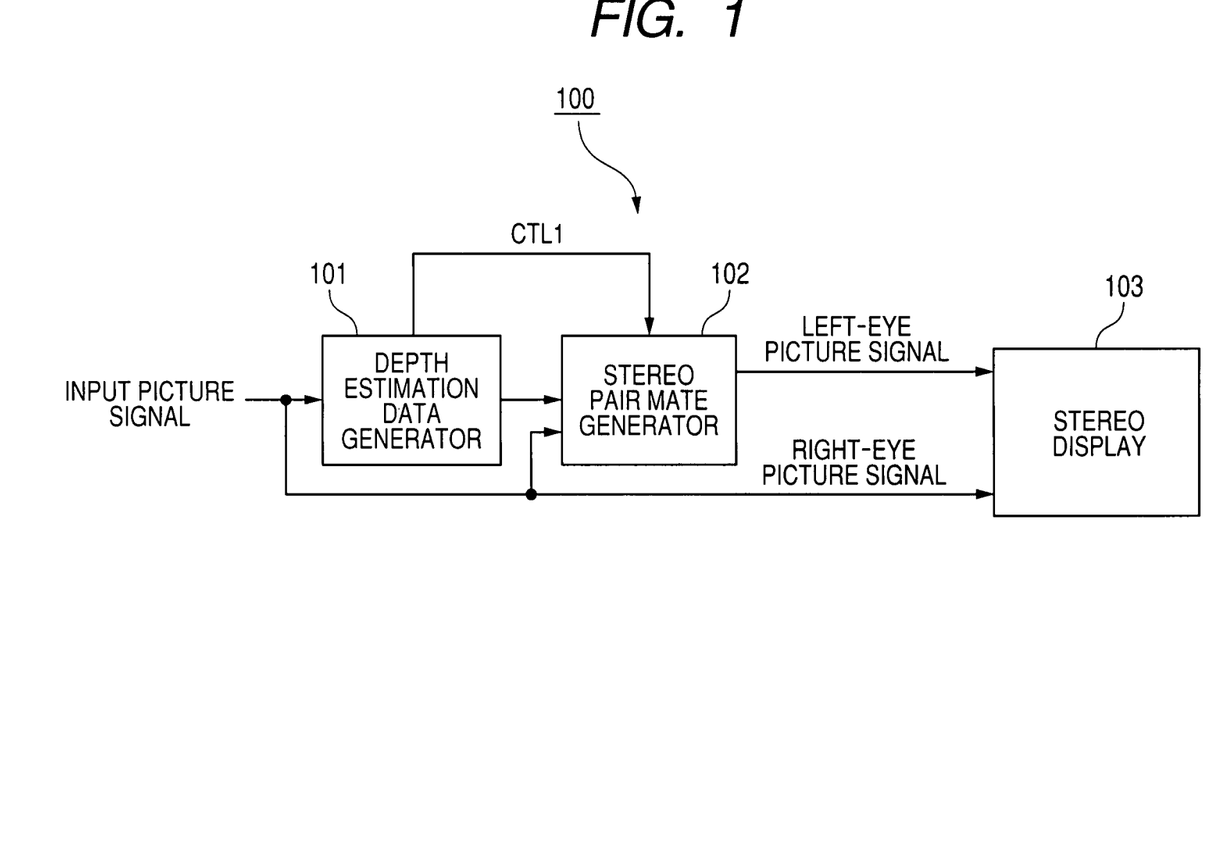
FIG. 1 is a block diagram of a pseudo 3D image creation apparatus according to an embodiment of this invention.

With reference to FIG. 1, a pseudo 3D (three-dimensional) image creation apparatus 100 in an embodiment of this invention includes a depth estimation data generator 101 and a stereo pair mate generator 102.

The depth estimation data generator 101 receives an input picture signal representing a non-3D image to be converted into a pseudo 3D image. The non-3D image has depth information supplied neither explicitly nor, unlike a stereo image, implicitly. The non-3D image is, for example, a repetitively-updated moving image or a still image. Generally, the input picture signal is composed of three primary color signals (R, G, and B signals). Preferably, the input picture signal is formed by quantized picture data. The depth estimation data generator 101 produces final depth estimation data and a control signal CTL1 from the input picture signal. The stereo pair mate generator 102 receives the final depth estimation data and the control signal CTL1 from the depth estimation data generator 101. The stereo pair mate generator 102 receives the input picture signal also. The stereo pair mate generator 102 produces a left-eye picture signal (a different-viewpoint picture signal, that is, a picture signal different in viewpoint from the input picture signal) from the final depth estimation data, the control signal CTL1, and the input picture signal. The input picture signal is used as a right-eye picture signal. The left-eye picture signal and the right-eye picture signal make a stereo pair.

A stereo display 103 receives the left-eye and right-eye picture signals and presents a pseudo 3D image to a viewer in response to the left-eye and right-eye picture signals. In other words, the left-eye and right-eye picture signals are outputted and fed to the stereo display 103 as a pseudo 3D picture signal. The stereo display 103 visualizes the pseudo 3D picture signal, and thereby indicates the pseudo 3D image.

The depth estimation data generator 101 estimates high-spatial-frequency components in a 1-frame array of the values of pixels represented by the input picture signal, and produces the control signal CTL1 on the basis of the estimated high-spatial-frequency components. Preferably, the estimated high-spatial-frequency components are of luminance.

The stereo pair mate generator 102 shifts the texture of the non-3D image represented by the input picture signal relative to frame in response to the final depth estimation data. This shift means that with respect to on-screen position. The stereo pair mate generator 102 adjusts the degree (amount) of shift of the non-3D image in accordance with the control signal CTL1. The shift quantity corresponds to a parallax quantity or an angle of vergence in binocular parallax. Thereby, the stereo pair mate generator 102 converts the input picture signal into a shift-result picture signal, that is, a picture signal different in viewpoint from the input picture signal. The stereo pair mate generator 102 produces the left-eye picture signal from the shift-result picture signal.

Figure 2:
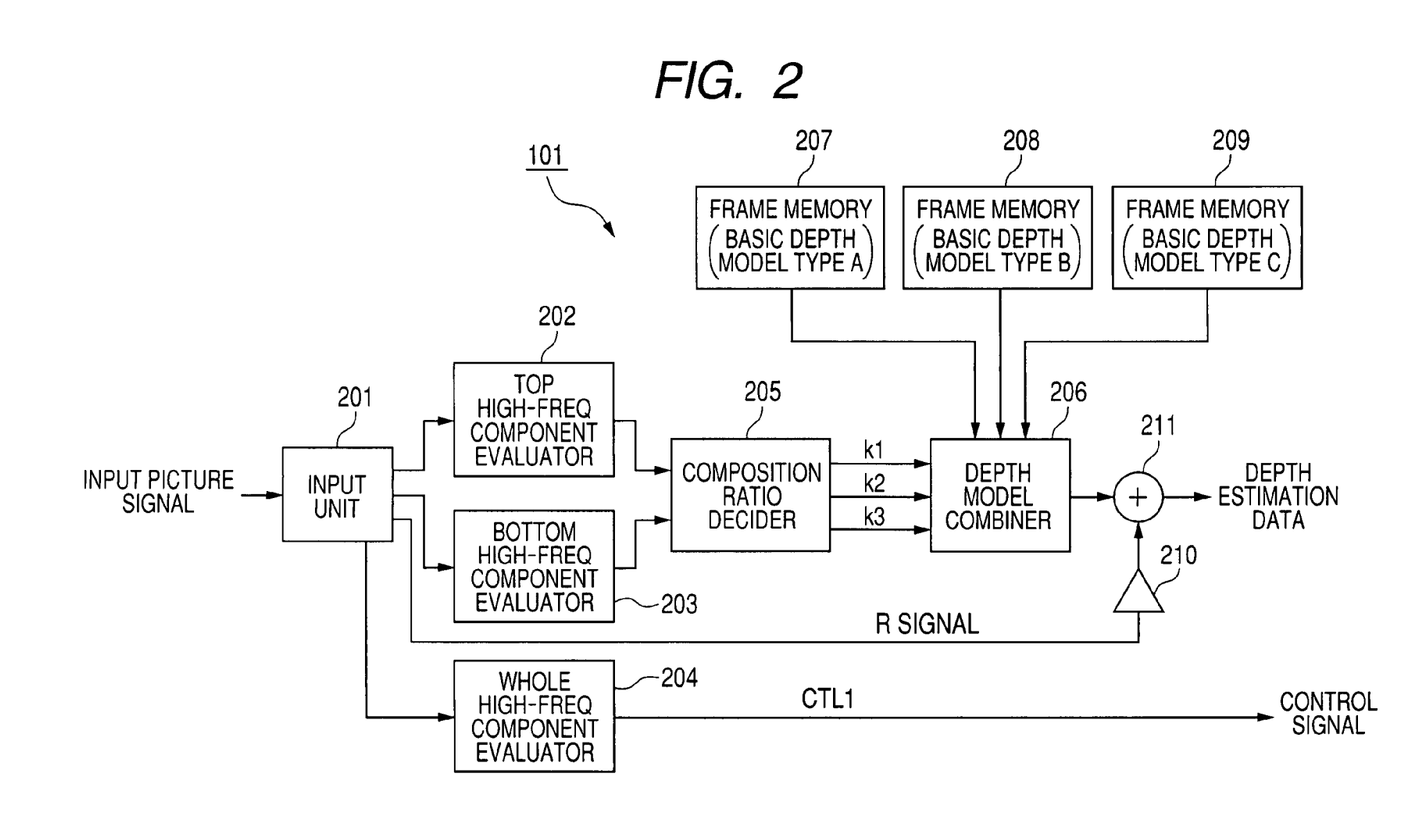
FIG. 2 is a block diagram of a depth estimation data generator in FIG. 1.

As shown in FIG. 2, the depth estimation data generator 101 includes an input unit 201, a top high-frequency component evaluator 202, a bottom high-frequency component evaluator 203, and a whole high-frequency component evaluator 204.

The input unit 201 receives the input picture signal and feeds the input picture signal to the evaluators 202, 203, and 204. The top high-frequency component evaluator 202 calculates an evaluation value of high-spatial-frequency components of the input picture signal for an about top 20% part of the non-3D image represented by the input picture signal. The bottom high-frequency component evaluator 203 calculates an evaluation value of high-spatial-frequency components of the input picture signal for an about bottom 20% part of the non-3D image represented by the input picture signal. The whole high-frequency component evaluator 204 calculates an evaluation value of high-spatial-frequency components of the input picture signal for the whole of the non-3D image represented by the input picture signal. Preferably, the high-spatial-frequency components are of the luminance signal in the input picture signal. The calculation by each of the evaluators 202, 203, and 204 is equivalent to estimating an amount of the high-spatial-frequency components.

The depth estimation data generator 101 further includes a composition ratio decider 205, a depth model combiner 206, frame memories 207, 208, and 209, a weighter 210, and an adder 211.

The frame memory 207 stores a signal representative of a 1-frame picture of a basic depth model type A. The frame memory 207 feeds the stored signal to the depth model combiner 206. The frame memory 208 stores a signal representative of a 1-frame picture of a basic depth model type B differing from the type A. The frame memory 208 feeds the stored signal to the depth model combiner 206. The frame memory 209 stores a signal representative of a 1-frame picture of a basic depth model type C differing from the types A and B. The frame memory 209 feeds the stored signal to the depth model combiner 206. The composition ratio decider 205 is informed of the evaluation values calculated by the top high-frequency component evaluator 202 and the bottom high-frequency component evaluator 203. The composition ratio decider 205 determines a composition ratio, at which the signals of the 1-frame pictures of the basic depth model types A, B, and C should be combined, on the basis of the evaluation values. The composition ratio decider 205 notifies the determined composition ratio to the depth model combiner 206. The depth model combiner 206 combines the signals of the 1-frame pictures of the basic depth model types A, B, and C into fundamental depth estimation data at a combination ratio equal to the notified composition ratio. The depth model combiner 206 feeds the fundamental depth estimation data to the adder 211. The input unit 201 extracts the R signal (the red signal) from the three primary color signals (the RGB signals) constituting the input picture signal, and feeds the extracted R signal to the weighter 210. The weighter 210 multiplies the R signal by a predetermined weighting coefficient to generate a weighted R signal. The weighter 210 feeds the weighted R signal to the adder 211. The adder 211 superimposes the weighted R signal on the fundamental depth estimation data to generate the final depth estimation data. The adder 211 outputs the final depth estimation data.

The composition ratio decider 205 and the depth model combiner 206 constitute combining means. The weighter 210 and the adder 211 constitute depth-estimation-data generating means.

The calculation by the top high-frequency component evaluator 202 is equivalent to evaluating the degree of complexity or the activity in the about top 20% part of the non-3D image. Similarly, the calculation by the bottom high-frequency component evaluator 203 is equivalent to evaluating the degree of complexity or the activity in the about bottom 20% part of the non-3D image. The calculation by the whole high-frequency component evaluator 203 is equivalent to evaluating the degree of complexity or the activity in the whole of the non-3D image. The method of the calculation by the top high-frequency component evaluator 202, the method of the calculation by the bottom high-frequency component evaluator 203, and the method of the calculation by the whole high-frequency component evaluator 204 may be similar in basic stages. The evaluators 202, 203, and 204 may be implemented by a common processing module. The evaluators 202, 203, and 204 may be provided outside the depth estimation data generator 101.

Figure 3:
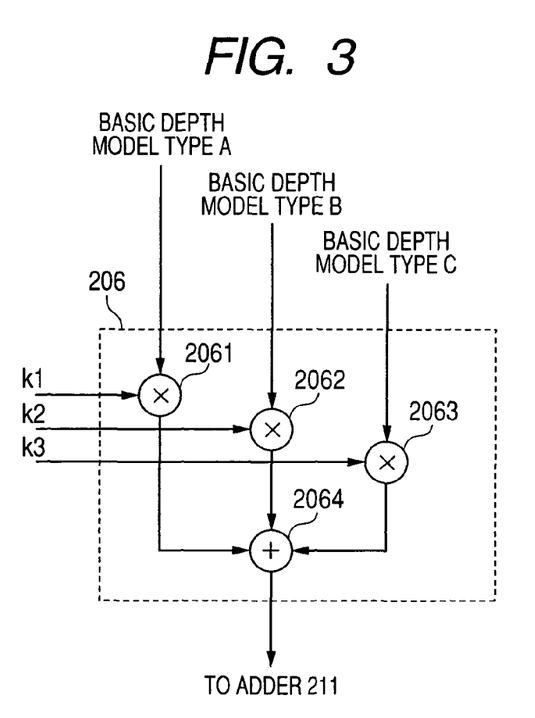
FIG. 3 is a block diagram of a depth model combiner in FIG. 2.

As shown in FIG. 3, the depth model combiner 206 includes multipliers 2061, 2062, and 2063, and an adder 2064. The composition ratio notified to the depth model combiner 206 from the composition ratio decider 205 is expressed by a set of coefficients k1, k2, and k3, where k1+k2+k3=1. As will be made clear later, the coefficients k1, k2, and k3 are assigned to the signals of the 1-frame pictures of the basic depth model types A, B, and C, respectively. The multipliers 2061, 2062, and 2063 are notified of the coefficients k1, k2, and k3, respectively. The multiplier 2061 receives the signal of the 1-frame picture of the basic depth model type A from the frame memory 207. The multiplier 2062 receives the signal of the 1-frame picture of the basic depth model type B from the frame memory 208. The multiplier 2063 receives the signal of the 1-frame picture of the basic depth model type C from the frame memory 209. The device 2061 multiplies the signal of the 1-frame picture of the basic depth model type A by the coefficient k1 to generate a multiplication-result type-A signal. The device 2062 multiplies the signal of the 1-frame picture of the basic depth model type B by the coefficient k2 to generate a multiplication-result type-B signal. The device 2063 multiplies the signal of the 1-frame picture of the basic depth model type C by the coefficient k3 to generate a multiplication-result type-C signal. The adder 2064 receives the multiplication-result type-A signal, the multiplication-result type-B signal, and the multiplication-result type-C signal from the multipliers 2061, 2062, and 2063. The device 2064 adds the multiplication-result type-A signal, the multiplication-result type-B signal, and the multiplication-result type-C signal to generate the fundamental depth estimation data. The adder 2064 outputs the fundamental depth estimation data to the adder 211 (see FIG. 2).

The basic depth model types A, B, and C are defined by depth values of basic scene structures. The basic depth model type A conforms to the concave surface of a sphere. The 1-frame picture of the basic depth model type A is used in many cases. The basic depth model type B is similar to the basic depth model type A except that its top part conforms to an arch-shaped cylindrical surface rather than a spherical surface. Thus, the top part of the basic depth model type B conforms to a cylindrical surface having an axis extending in a vertical direction, and the bottom part thereof conforms to a concave spherical surface. The top part of the basic depth model type C conforms to a flat surface, and the bottom part thereof conforms to a cylindrical surface having an axis extending in a horizontal direction. Regarding the basic depth model type C, the cylindrical surface continues from the flat surface and bends into a frontward direction as it gets near the bottom edge.

Figure 4:
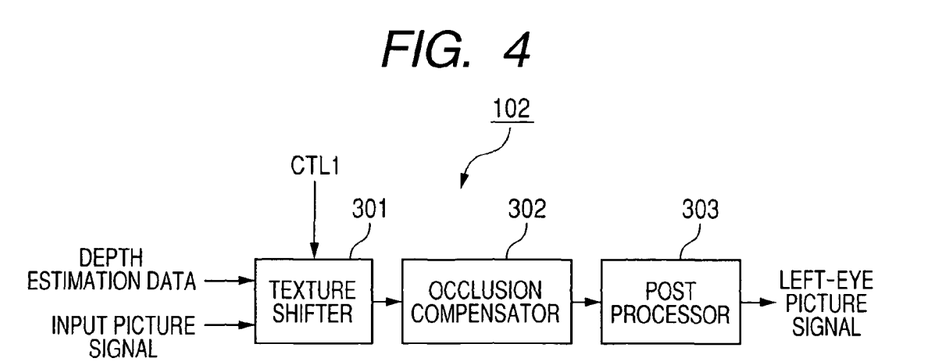
FIG. 4 is a block diagram of a stereo pair mate generator in FIG. 1.

As shown in FIG. 4, the stereo pair mate generator 102 includes a texture shifter 301, an occlusion compensator 302, and a post processor 303 which are serially connected in that order. The occlusion compensator 302 and the post processor 303 constitute outputting means.

The texture shifter 301 receives the final depth estimation data and the control signal CTL1 from the depth estimation data generator 101. The texture shifter 301 receives the input picture signal also. The device 301 shifts the non-3D image represented by the input picture signal relative to frame in response to the final depth estimation data and the control signal CTL1 to generate a different-viewpoint image (an image seen from a viewpoint different from that for the non-3D image). In general, an object displayed in front of the screen is seen in the more inward side (nose side) of the viewer as the object is closer to the viewer. On the other hand, an object displayed behind the screen is seen in the more outward side of the viewer as the object is closer to the viewer. Accordingly, in the case of generating an image seen from a viewpoint shifted leftward from that for the non-3D image represented by the input picture signal, the device 301 shifts a part of the texture of the non-3D image, which is to be displayed in front of the screen, to the inward (that is, the right) by an amount depending on the final depth estimation data. The device 301 shifts a part of the texture of the non-3D image, which is to be displayed behind the screen, to the outward (that is, the left) by an amount depending on the final depth estimation data. In this way, the texture shifter 301 converts the input picture signal into a shift-result picture signal, that is, a different-viewpoint picture signal (a picture signal different in viewpoint from the input picture signal). The texture shifter 301 feeds the shift-result picture signal to the occlusion compensator 302. The texture shifter 301 passes the input picture signal to the occlusion compensator 302.

As a result of the shifting by the texture shifter 301, an image part where no texture is present, that is, an occlusion, is sometimes caused depending on an intra-image positional relation change. The occlusion compensator 302 fills such a part of the image represented by the shift-result picture signal with the corresponding part of the non-3D image represented by the input picture signal, and thereby compensates for an occlusion in the image represented by the shift-result picture signal. Alternatively, the device 302 may implement occlusion compensation about the shift-result picture signal in a known way using the texture statistics of an image segmented. In this way, the occlusion compensator 302 converts the shift-result picture signal into an occlusion-free picture signal. The occlusion compensator 302 feeds the occlusion-free picture signal to the post processor 303.

The post processor 303 subjects the occlusion-free picture signal to known post processing such as smoothing to generate the left-eye picture signal. The post processor 303 outputs the left-eye picture signal. The post processing by the device 303 is to reduce noises in the occlusion-free picture signal which are caused by the previous-stage processing.

Operation of the pseudo 3D image creation apparatus 100 will be described below in more detail. The input unit 201 in the depth estimation data generator 101 receives the input picture signal representing the non-3D image to be converted into the pseudo 3D image. As previously explained, the non-3D image is, for example, a repetitively-updated moving image or a still image. Generally, the input picture signal is composed of three primary color signals (R, G, and B signals). Preferably, the input picture signal is formed by the quantized picture data. The input unit 201 passes the input picture signal to the top high-frequency component evaluator 202, the bottom high-frequency component evaluator 203, and the whole high-frequency component evaluator 204. The input unit 201 extracts the R signal from the input picture signal, and feeds the extracted R signal to the weighter 210.

The top high-frequency component evaluator 202 divides the about top 20% part of the non-3D image represented by the input picture signal into blocks each composed of 8 pixels in the horizontal direction and 8 pixels in the vertical direction. The top high-frequency component evaluator 202 carries out calculation for each block by using the following equation.

$$\sum_{i,j} (|Y(i, j) - Y(i+2, j)| + |Y(i, j) - Y(i, j+2)|) \quad (1)$$

where Y(i, j) denotes the luminance signal in the input picture signal at the pixel point (i, j) in each block.

According to the equation (1), computations are made as to the absolute value of the difference between the luminance signal for the pixel of interest and the luminance signal for the pixel second next to the pixel of interest in the horizontal direction and the absolute value of the difference between the luminance signal for the pixel of interest and the luminance signal for the pixel second next to the pixel of interest in the vertical direction. Then, the computed absolute values are added to obtain an addition result. These computing steps are iterated while the pixel of interest is sequentially changed from one to another among all the pixels constituting the block. Consequently, addition results are obtained for the respective pixels constituting the block. Then, the addition results are summed to produce the intended value for the block.

The top high-frequency component evaluator 202 computes the average of the values produced by the above calculation for the blocks in the about top 20% part of the non-3D image. The top high-frequency component evaluator 202 labels the computed average as a top high-frequency component evaluation value. The top high-frequency component evaluator 202 notifies the top high-frequency component evaluation value to the composition ratio decider 205.

Similarly, the bottom high-frequency component evaluator 203 divides the about bottom 20% part of the non-3D image represented by the input picture signal into blocks each composed of 8 pixels in the horizontal direction and 8 pixels in the vertical direction. The bottom high-frequency component evaluator 203 carries out calculation for each block by using the above equation (1). Then, the bottom high-frequency component evaluator 203 computes the average of the values produced by the above calculation for the blocks in the about bottom 20% part of the non-3D image. The bottom high-frequency component evaluator 203 labels the computed average as a bottom high-frequency component evaluation value. The bottom high-frequency component evaluator 203 notifies the bottom high-frequency component evaluation value to the composition ratio decider 205.

The whole high-frequency component evaluator 204 divides the whole of the non-3D image represented by the input picture signal into blocks each composed of 8 pixels in the horizontal direction and 8 pixels in the vertical direction. The whole high-frequency component evaluator 204 carries out calculation for each block by using the above equation (1). Then, the whole high-frequency component evaluator 204 computes the average of the values produced by the above calculation for the blocks in the whole of the non-3D image. The whole high-frequency component evaluator 204 labels the computed average as a whole high-frequency component evaluation value. The whole high-frequency component evaluator 204 outputs a signal representative of the whole high-frequency component evaluation value as the control signal CTL1. The whole high-frequency component evaluator 204 feeds the control signal CTL1 to the texture shifter 301 in the stereo pair mate generator 102.

The composition ratio decider 205 determines the coefficients k1, k2, and k3 for the composition ratio on the basis of the top and bottom high-frequency component evaluation values.

Figure 5:
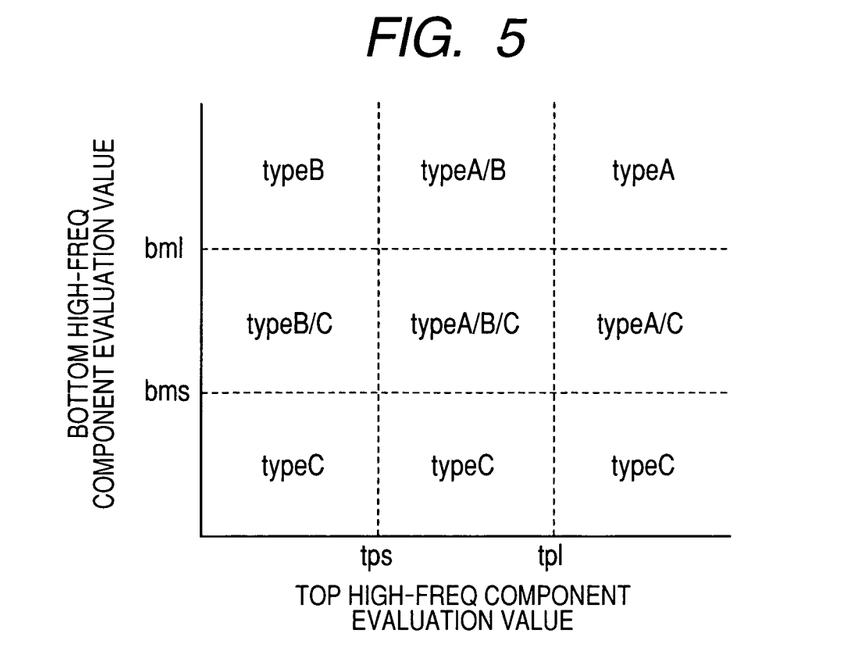
FIG. 5 is a diagram showing an example of a relation among selected one or ones of signals of 1-frame pictures of basic depth model types A, B, and C, a top high-frequency component evaluation value, and a bottom high-frequency component evaluation value in the embodiment of this invention.

FIG. 5 shows an example of the relation among selected one or ones of the signals of the 1-frame pictures of the basic depth model types A, B, and C, the top high-frequency component evaluation value, and the bottom high-frequency component evaluation value. In FIG. 5, the ordinate denotes the bottom high-frequency component evaluation value while the abscissa denotes the top high-frequency component evaluation value.

With reference to FIG. 5, when the bottom high-frequency component evaluation value is smaller than a lower predesignated value "bms", only the signal of the 1-frame picture of the basic depth model type C is selected independent of the top high-frequency component evaluation value (type C in FIG. 5). In this case, the composition ratio decider 205 sets the coefficients k1, k2, and k3 to 0, 0, and 1 respectively.

When the bottom high-frequency component evaluation value is greater than an upper predesignated value "bml" and the top high-frequency component evaluation value is smaller than a lower predesignated value "tps", only the signal of the 1-frame picture of the basic depth model type B is selected (type B in FIG. 5). In this case, the composition ratio decider 205 sets the coefficients k1, k2, and k3 to 0, 1, and 0 respectively.

When the bottom high-frequency component evaluation value is greater than the upper predesignated value "bml" and the top high-frequency component evaluation value is greater than an upper predesignated value "tpl", only the signal of the 1-frame picture of the basic depth model type A is selected (type A in FIG. 5). In this case, the composition ratio decider 205 sets the coefficients k1, k2, and k3 to 1, 0, and 0 respectively.

When the bottom high-frequency component evaluation value is greater than the upper predesignated value "bml" and the top high-frequency component evaluation value is between the lower predesignated value "tps" and the upper predesignated value "tpl", only the signals of the 1-frame pictures of the basic depth model types A and B are selected (type A/B in FIG. 5). When the bottom high-frequency component evaluation value is between the lower predesignated value "bms" and the upper predesignated value "bml" and the top high-frequency component evaluation value is smaller than the lower predesignated value "tps", only the signals of the 1-frame pictures of the basic depth model types B and C are selected (type B/C in FIG. 5). When the bottom high-frequency component evaluation value is between the lower predesignated value "bms" and the upper predesignated value "bml" and the top high-frequency component evaluation value is between the lower predesignated value "tps" and the upper predesignated value "tpl", all the signals of the 1-frame pictures of the basic depth model types A, B, and C are selected (type A/B/C in FIG. 5). When the bottom high-frequency component evaluation value is between the lower predesignated value "bms" and the upper predesignated value "bml" and the top high-frequency component evaluation value is greater than the upper predesignated value "tpl", only the signals of the 1-frame pictures of the basic depth model types A and C are selected (type A/C in FIG. 5).

In the regions "type A/B", "type A/C", "type B/C", and "type A/B/C" of FIG. 5, the composition ratio decider 205 determines the coefficients k1, k2, and k3 for the composition ratio as follows.

In the region "type A/B", the combination ratio between the signals of the 1-frame pictures of the basic depth model types A and B is determined by the ratio between "TA−tps" and "tpl−TA", where TA denotes a top activity equal to the top high-frequency component evaluation value. In the region "type A/B", only the signals of the 1-frame pictures of the basic depth model types A and B are used while the signal of the 1-frame picture of the basic depth model type C is not. Accordingly, the composition ratio is determined according to the following relation.

Type $A$:Type $B$:Type $C=(TA-tps):(tpl-TA):0$

In the region "type A/C", the combination ratio between the signals of the 1-frame pictures of the basic depth model types A and C is determined by the ratio between "BA−bms" and "bml−BA", where BA denotes a bottom activity equal to the bottom high-frequency component evaluation value. In the region "type A/C", only the signals of the 1-frame pictures of the basic depth model types A and C are used while the signal of the 1-frame picture of the basic depth model type B is not. Accordingly, the composition ratio is determined according to the following relation.

Type $A$:Type $B$:Type $C=(BA-bms):0:(bml-BA)$

In the region "type B/C", the combination ratio between the signals of the 1-frame pictures of the basic depth model types B and C is determined by the ratio between "BA−bms" and "bml−BA". In the region "type B/C", only the signals of the 1-frame pictures of the basic depth model types B and C are used while the signal of the 1-frame picture of the basic depth model type A is not. Accordingly, the composition ratio is determined according to the following relation.

Type $A$:Type $B$:Type $C=0:(BA-bms):(bml-BA)$

In the region "type A/B/C", the average of the composition ratios for the regions "type A/B" and "type A/C" is used, and the final composition ratio is determined according to the following relation.

Type $A$:Type $B$:Type $C=(TA-tps)+(BA-bms):(tpl-TA):(bml-BA)$

In the regions "type A/B", "type A/C", "type B/C", and "type A/B/C", the coefficients k1, k2, and k3 for the composition ratio are given as follows.

$k1$=Type $A$/(Type $A$+Type $B$+Type $C$)

$k2$=Type $B$/(Type $A$+Type $B$+Type $C$)

$k3$=Type $C$/(Type $A$+Type $B$+Type $C$)

The depth model combiner 206 is notified of the coefficients k1, k2, and k3 determined by the composition ratio decider 205. The depth model combiner 206 receives the signals of the 1-frame pictures of the basic depth model types A, B, and C from the frame memories 207, 208, and 209. As previously explained, in the depth model combiner 206, the multiplier 2061 multiplies the signal of the 1-frame picture of the basic depth model type A by the coefficient k1 to generate a multiplication-result type-A signal. The multiplier 2062 multiplies the signal of the 1-frame picture of the basic depth model type B by the coefficient k2 to generate a multiplication-result type-B signal. The multiplier 2063 multiplies the signal of the 1-frame picture of the basic depth model type C by the coefficient k3 to generate a multiplication-result type-C signal. The adder 2064 adds the multiplication-result type-A signal, the multiplication-result type-B signal, and the multiplication-result type-C signal to generate the fundamental depth estimation data. The adder 2064 outputs the fundamental depth estimation data to the adder 211 (see FIG. 2).

As described above, the three types of basic depth models are prepared as depth structure models for basic scenes. The evaluation values of high-frequency components of the luminance signal in the input picture signal are calculated for the top part and the bottom part of the non-3D image represented by the input picture signal. Although the basic depth model A is used as the base, the composition ratio varies according to the scene. Specifically, when the top-part evaluation value is low, the ratio of the basic depth model B is increased to make the depth in the top part greater with the recognition that there is a sky or a flat wall in the top part. When the bottom-part evaluation value is low, the ratio of the basic depth model C is increased to make the top part flat as a distant view and to make the depth smaller as it gets near the lower edge of the bottom part with the recognition that there is a flat ground or a continuously-extending surface of the water in the bottom part. Therefore, any image can be displayed naturally and, at the same time, the scene structure can be determined as close to the real structure as possible.

With reference back to FIG. 2, the weighter 210 receives, from the input unit 201, the R signal in the input picture signal. The weighter 210 multiplies the R signal by the predetermined weighting coefficient to generate the weighted R signal. The weighter 210 feeds the weighted R signal to the adder 211. The depth model combiner 206 feeds the fundamental depth estimation data to the adder 211. The adder 211 superimposes the weighted R signal on the fundamental depth estimation data to generate the final depth estimation data. The adder 211 outputs the final depth estimation data.

One of the reasons for using the R signal is that in an environment almost equivalent to the front-light environment and under a condition where the texture brightness does not change largely, the rules of thumb show that the intensity of the R signal matches the concavity and convexity of the object in many cases. Another reason is that the red color and a warm color, called advancing colors in chromatics, are characterized in that they make the depth to be recognized closer to the front than a cold color. The attribute that makes the depth to be recognized closer to the front can enhance the cubic effect (the 3D effect).

While the red color and a warm color are advancing colors, the blue color is a receding color that makes the depth to be recognized in a more backward position than a warm color. Therefore, the cubic effect can also be enhanced by placing a blue part in the back. The cubic effect can also be enhanced by combining these two attributes, that is, by placing a red part in the front and a blue part in the back.

The adder 211 in the depth estimation data generator 101 feeds the final depth estimation data to the stereo pair mate generator 102. The texture shifter 301 in the stereo pair mate generator 102 receives the final depth estimation data. The texture shifter 301 receives the control signal CTL1 from the depth estimation data generator 101. The texture shifter 301 receives the input picture signal also. The device 301 shifts the non-3D image represented by the input picture signal relative to frame in response to the final depth estimation data and the control signal CTL1 to generate a different-viewpoint image (an image seen from a viewpoint different from that for the non-3D image).

Preferably, the final depth estimation data is divided into 8-bit segments assigned to the respective pixels or the respective unit blocks constituting the non-3D image represented by the input picture signal. Every 8-bit segment of the final depth estimation data indicates a depth estimation value Yd. In ascending order of the depth estimation values Yd, that is, sequentially beginning with the one assigned to an image part positioned in the back, the texture shifter 301 shifts a part of the texture of the non-3D image represented by the input picture signal, which corresponds to the depth estimation value Yd of interest, to the right by $\alpha \cdot (Yd-m)/n$ pixels. Here, "m" denotes a reference depth, and a part of the image with Yd greater than "m" is displayed in front of the screen and a part of the image with Yd smaller than "m" is displayed in the back of the screen. In addition, "n" denotes a parameter for adjusting the cubic effect, and "α" denotes a multiplication coefficient decided by the control signal CTL1. When the value "$\alpha \cdot (Yd-m)/n$" is positive, the texture shift is rightward. When the value "$\alpha \cdot (Yd-m)/n$" is negative, the texture shift is leftward. When the value "$\alpha \cdot (Yd-m)/n$" is zero, no texture shift is performed.

The multiplication coefficient "α" is decided as follows. The characters SC denote the evaluation value currently represented by the control signal CTL1, that is, the whole high-frequency component evaluation value. The evaluation value SC is equal to a fixed value SCa when the non-3D image represented by the input picture signal has a moderately complicated pattern judged from a subjective point of view. The texture shifter 301 computes the ratio SC/SCa. Then, the texture shifter 301 decides the multiplication coefficient "α" on the basis of the computed ratio SC/SCa according to a predetermined relation between the multiplication coefficient "α" and the ratio SC/SCa. An example of the predetermined relation is shown in FIG. 6.

Figure 6:
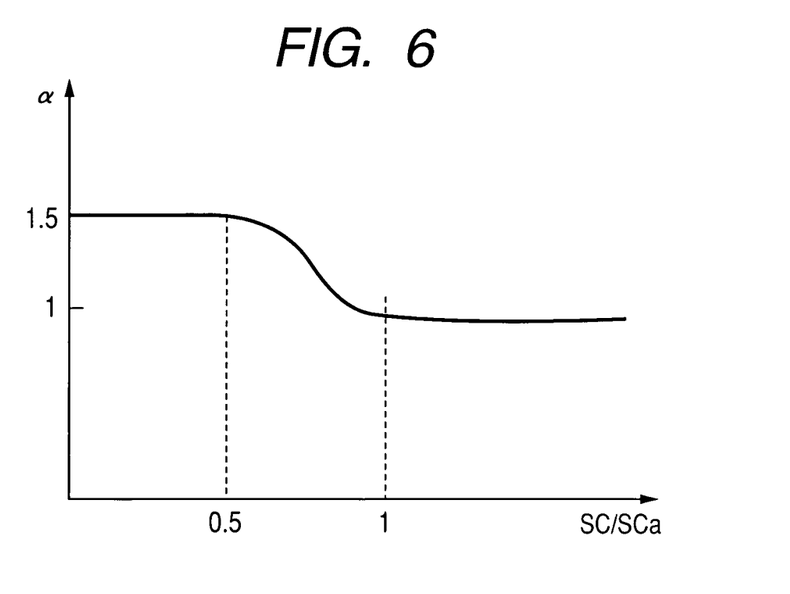
FIG. 6 is a diagram showing an example of a predetermined relation between a multiplication coefficient "α" and a ratio SC/SCa which is used by a texture shifter in FIG. 4.

With reference to FIG. 6, the texture shifter 301 sets the multiplication coefficient "α" to 1.5 when the ratio SC/SCa is equal to or smaller than 0.5. The texture shifter 301 sets the multiplication coefficient "α" to 1 when the ratio SC/SCa is equal to or greater than 1. The texture shifter 301 nonlinearly decreases the multiplication coefficient "α" from 1.5 to 1 as the ratio SC/SCa increases from 0.5 to 1.

Accordingly, in the case where the non-3D image represented by the input picture signal has a considerably complicated pattern so that the ratio SC/SCa is greater than 1, the texture shifter 301 sets the multiplication coefficient "α" to 1 and shifts the texture of the non-3D image to the right by $(Yd-m)/n$ pixels. In the case where the non-3D image represented by the input picture signal has a simple pattern so that the ratio SC/SCa is between 0.5 and 1, the texture shifter 301 sets the multiplication coefficient "α" to a value between 1 and 1.5 and shifts the texture of the non-3D image to the right by $\alpha \cdot (Yd-m)/n$ pixels. In this case, the multiplication coefficient "α" increases from 1 to 1.5 as the ratio SC/SCa decreases from 1 to 0.5. Thus, in this case, as the pattern of the non-3D image is simpler and hence the ratio SC/SCa decreases from 1, the multiplication coefficient "α" set by the texture shifter 301 increases from 1 so that the amount of the texture shift by the texture shifter 301 (that is, $\alpha \cdot (Yd-m)/n$ pixels) increases also. Therefore, the texture shift amount is controlled depending on the degree of complexity or simplicity of the pattern of the non-3D image. The texture shift amount relates to parallax, and the control of the shift amount enables the cubic effect attained for a non-3D image having a simple pattern and few edges only to be comparable to that attained for a non-3D image having a complicated pattern and a lot of edges.

In the case where the non-3D image represented by the input picture signal has a very simple pattern so that the ratio SC/SCa is smaller than 0.5, the texture shifter 301 sets the multiplication coefficient "α" to 1.5 and shifts the texture of the non-3D image to the right by $1.5 \cdot (Yd-m)/n$ pixels. Thus, the multiplication coefficient "α" is limited to 1.5 while the shift amount is limited to $1.5 \cdot (Yd-m)/n$ pixels. These limitations prevent a stereo image from being provided with excessive parallax which might cause a failure.

In the case where the input picture signal represents a repetitively-updated moving image, an inter-frame correlation may be utilized and a multiplication coefficient "α" decided for a previous frame or field can be used as one for a current frame or field. Thereby, the input picture signal for the current frame or field can be processed without waiting for the completion of calculation of a whole high-frequency component evaluation value for the current frame or field. Thus, it is unnecessary to provide an additional frame or field memory to store the input picture signal for the previous frame or field. Furthermore, it is possible to reduce a signal delay caused by the processing of the input picture signal.

As previously explained, the input picture signal is used as the right-eye picture signal. The post processor 303 in the stereo pair mate generator 102 outputs the left-eye picture signal. The right-eye picture signal and the left-eye picture signal make a stereo pair. The right-eye and left-eye picture signals are fed to the stereo display 103. The stereo display 103 indicates a pseudo 3D image to a viewer in response to the right-eye and left-eye picture signals.

The stereo display 103 includes, for example, one of a projection system in which polarized glasses are used, a projection system or a display system in which a time-sharing-based indication technique and liquid-crystal shutter glasses are combined, a lenticular-mode stereo display, a parallax-barrier-based stereo display, an anaglyph-mode stereo display, and a head-mounted display. The stereo display 103 may include a projection system composed of two projectors corresponding to left-eye and right-eye images making a stereo pair respectively.

As previously explained, the whole high-frequency component evaluator 204 divides the whole of the non-3D image represented by the input picture signal into equal-size blocks. The whole high-frequency component evaluator 204 carries out calculation for each block by using the above equation (1). During this calculation, computations are made as to the absolute value of the difference between the luminance signal for the pixel of interest and the luminance signal for the pixel second next to the pixel of interest in the horizontal direction and the absolute value of the difference between the luminance signal for the pixel of interest and the luminance signal for the pixel second next to the pixel of interest in the vertical direction. Then, the computed absolute values are added to obtain an addition result. These computing steps are iterated while the pixel of interest is sequentially changed from one to another among all the pixels constituting the block. Consequently, addition results are obtained for the respective pixels constituting the block. Then, the addition results are summed to produce the intended value for the block. Thereafter, the whole high-frequency component evaluator 204 computes the average of the values produced by the above calculation for the blocks in the whole of the non-3D image. The whole high-frequency component evaluator 204 labels the computed average as a whole high-frequency component evaluation value. The whole high-frequency component evaluator 204 notifies the whole high-frequency component evaluation value to the texture shifter 301. The amount of the texture shift provided by the texture shifter 301 (that is, the degree or intensity of the cubic effect) is controlled depending on the whole high-frequency component evaluation value. The control of the texture shift amount is designed to enable the cubic effect attained for a non-3D image having a simple pattern and few edges only to be comparable to that attained for a non-3D image having a complicated pattern and a lot of edges.

Alternatively, the control of the texture shift amount in response to the whole high-frequency component evaluation value may be designed as follows. According to a first example, the whole high-frequency component evaluation value is added to or subtracted from a basic desired texture shift amount to obtain a final desired texture shift amount by which an actual texture shift is implemented. According to a second example, the parameter "n" or the reference depth "m" is varied as a function of the whole high-frequency component evaluation value. According to a third example, the weighting coefficient used in the weighter 210 is varied as a function of the whole high-frequency component evaluation value.

The input picture signal may be used as a left-eye picture signal. In this case, the picture signal outputted from the stereo pair mate generator 102 is used as a right-eye picture signal making a stereo pair in conjunction with the left-eye picture signal. A first different-viewpoint picture signal and a second different-viewpoint picture signal may be generated through rightward viewpoint shift and leftward viewpoint shift of the non-3D image represented by the input picture signal, respectively. In this case, the first and second different-viewpoint picture signals make a stereo pair. Three or more different-viewpoint picture signals may be generated. In this case, the stereo display 103 is replaced by a three-viewpoint or more-viewpoint display for indicating a pseudo 3D image from the three or more different-viewpoint picture signals.

An audio output device may be provided. For example, the audio output device is installed in the stereo display 103. In this case, for a video content with no audio information such as a still image, an ambient sound suitable for the video content may be added.

A computer system may replace the depth estimation data generator 101 and the stereo pair mate generator 102. In this case, the computer system is controlled by a computer program installed therein. The computer program is designed to enable the computer system to implement operation steps equivalent to the functions of the depth estimation data generator 101 and the stereo pair mate generator 102. The computer program can be read from a recording medium into the computer system or may be downloaded into the computer system via a network.

What is claimed is:

1. A pseudo 3D image creation apparatus comprising:
a memory configured to store a plurality of basic depth models indicating depth values of a plurality of basic scene structures;
a calculator configured to calculate statistical amounts of pixel values in predetermined areas in a non-3D image to generate first evaluation values, wherein the non-3D image has depth information supplied neither explicitly nor, unlike a stereo image, implicitly;
a calculator configured to calculate a statistical amount of pixel values in a whole of the non-3D image to generate a second evaluation value;
a combining device configured to combine said stored plurality of basic depth models into a combination result according to a combination ratio depending on the generated first evaluation values;
a generator configured to generate depth estimation data from said combination result and the non-3D image;
a shifter configured to compute a ratio between the generated second evaluation value and a prescribed value and shift a texture of the non-3D image in response to the computed ratio and the generated depth estimation data to generate a different-viewpoint picture signal; and
an outputting device configured to output the generated different-viewpoint picture signal and a picture signal representative of the non-3D image as a pseudo 3D picture signal;
wherein the shifter compares the computed ratio with a threshold value to generate a comparison result and sets a coefficient depending on the generated comparison result, and shifts the texture of the non-3D image in response to a product of the generated depth estimation data and the set coefficient; and
wherein the shifter sets the coefficient greater than 1 when the computed ratio is less than the threshold value.

2. The pseudo 3D image creation apparatus of claim 1, wherein the shifter sets the coefficient to a fixed value greater than 1 when the computed ratio is less than a predetermined value smaller than the threshold value, and sets the coefficient decreasing as the computed ratio increases from the predetermined value to the threshold value.

3. A pseudo 3D image display system comprising:
a memory configured to store a plurality of basic depth models indicating depth values of a plurality of basic scene structures;
a first calculator configured to calculate statistical amounts of pixel values in predetermined areas in a non-3D image to generate first evaluation values, wherein the non-3D image has depth information supplied neither explicitly nor, unlike a stereo image, implicitly;
a second calculator configured to calculate a statistical amount of pixel values in a whole of the non-3D image to generate a second evaluation value;
a combining device configured to combine said stored plurality of basic depth models into a combination result according to a combination ratio depending on the generated first evaluation values;
a data generator configured to generate depth estimation data from said combination result and the non-3D image;
a texture shifter configured to compute a ratio between the generated second evaluation value and a prescribed value and shift a texture of the non-3D image in response to the computed ratio and the generated depth estimation data to generate a different-viewpoint picture signal;
an outputting device configured to output the generated different-viewpoint picture signal and a picture signal representative of the non-3D image as a pseudo 3D picture signal; and
a display device configured to use one of the generated different-viewpoint picture signal and the picture signal representative of the non-3D image which are outputted from the outputting device as a right-eye picture signal and use the other as a left-eye picture signal, and indicate a pseudo 3D image in response to the right-eye picture signal and the left-eye picture signal;
wherein the texture shifter compares the computed ratio with a threshold value to generate a comparison result and sets a coefficient depending on the generated comparison result, and shifts the texture of the non-3D image in response to a product of the generated depth estimation data and the set coefficient; and wherein the texture shifter sets the coefficient greater than 1 when the computed ratio is less than the threshold value.

4. The pseudo 3D image display system of claim 3, wherein the texture shifter sets the coefficient to a fixed value greater than 1 when the computed ratio is less than a predetermined value smaller than the threshold value, and sets the coefficient decreasing as the computed ratio increases from the predetermined value to the threshold value.

* * * * *